G. C. Taft,
Wrench.

N° 23,725.  Patented Apr. 19, 1859.

Witnesses.
James H. Bancroft
Wm H. Taft

Inventor:
Geo. C. Taft

UNITED STATES PATENT OFFICE.

GEORGE C. TAFT, OF WORCESTER, MASSACHUSETTS.

WRENCH.

Specification of Letters Patent No. 23,725, dated April 19, 1859.

*To all whom it may concern:*

Be it known that I, GEORGE C. TAFT, of the city of Worcester, in the Commonwealth of Massachusetts, have invented a new and useful Improved Double-Acting Screw-Wrench; and I do hereby declare that the following is a full and exact description thereof, reference being had to the accompanying drawings, in which—

Figure 1:
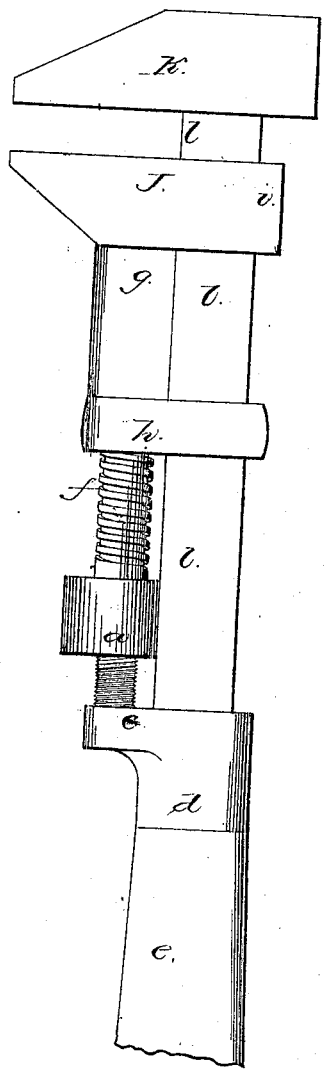
Figure 2:
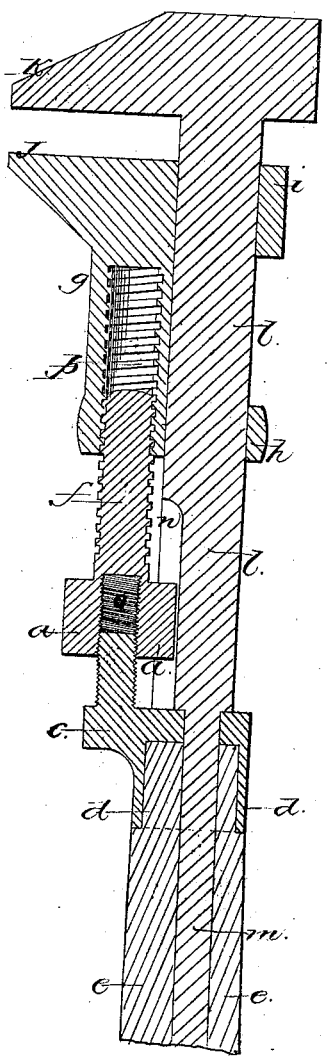

Figure 1, represents a side view and Fig. 2, a longitudinal section of my improved device.

To enable others skilled in the art to make and use my invention, I will proceed to describe its construction and operation.

The device represented in the accompanying drawings and in the following description, is an improvement on the patent granted to me June 16th, 1857. In the device then patented, the screw rod $b$, was one piece with the rosette $a$, and worked through a female screw in a projection of the ferrule $d$. Thus the end of the screw rod $b$, as it screwed through and projected beyond the projection of the ferrule was exposed and liable to be bruised, besides it proved to be a great inconvenience as it came in contact with and was in the way of the hand holding the handle $c$.

It is the object of the device now presented, to overcome the difficulties above mentioned.

In the device which is the subject of this application and which is represented in the accompanying drawings, the screw rod $b$, is one piece with the ferrule $d$, extending from the projection $c$, of the said ferrule, and screwing into the female screw $o$, of rosette $a$, which latter is one piece with the screw rod $f$. The screw rod $f$, works in the female screw $p$, in the sliding jaw $g$ $j$, the latter being connected to the shank $l$, by means of collars $h, i$. The stationary jaw $k$, forms the front end of the shank $l$, while the rear portion of the shank is formed into a rod $m$, which passes through the ferrule and handle and is fastened at the rear end of the handle by a nut, not shown in the drawings. The shank $l$, is excavated at $n$, to make room for the play of the rosette $a$.

From the above it will be seen that no ends of the screw rod $b$, are exposed and that it can never interfere with the hand taking hold of the handle. The screw rod $b$, is of sufficient length, so that its end will be yet within the female screw in the rosette $a$, when the jaw $j$, has been moved up until in contact with the jaw $k$. The length of the screw rod $f$, is also such that it can never become detached from the female screw within the jaw $g$ $j$. Thus it will be seen that all the pieces are permanently connected and that it is impossible for them to become disconnected.

The double screw device $b$, and $f$, serves to accelerate the motion of the jaw $g$ $j$, because, supposing the inclination of the threads of both screws to be the same, it is evident that with each turn of the rosette, the jaw will move twice as far as if only one screw was used. Of course the screw threads of $b$, and $f$, run against each other.

Having described my improved double acting screw wrench, what I claim therein as new and desire to secure by Letters Patent, is:

The rosette $a$, with its female screw $o$, in combination with the stationary screw $b$, traversing male screw $f$, and sliding jaw $g$ $h$, with its female screw $p$, substantially as and for the purposes set forth.

GEO. C. TAFT.

Witnesses:
 JAMES H. BANCROFT,
 WM. H. TAFT.